Oct. 6, 1925.

B. E. HILL 1,556,112

APPARATUS AND PROCESS FOR DEHAIRING ANIMAL CARCASSES

Filed Jan. 6, 1923 2 Sheets-Sheet 1

Oct. 6, 1925.
B. E. HILL
1,556,112
APPARATUS AND PROCESS FOR DEHAIRING ANIMAL CARCASSES
Filed Jan. 6, 1923      2 Sheets-Sheet 2
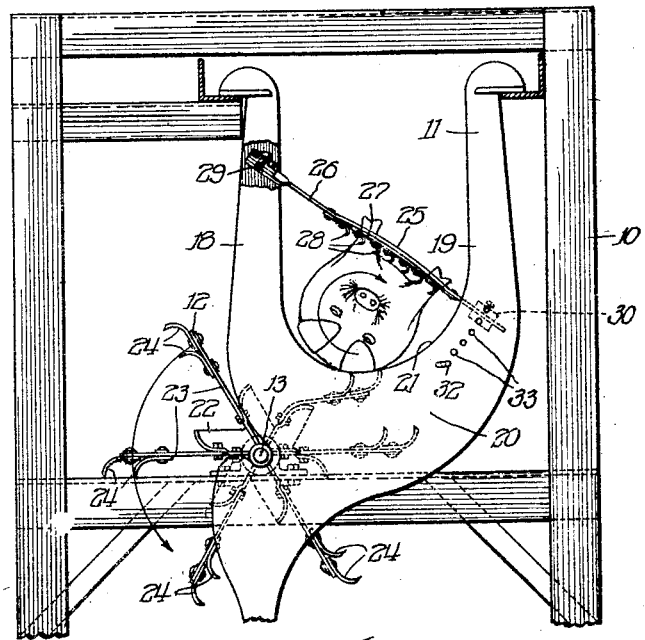
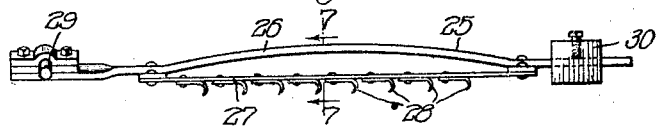
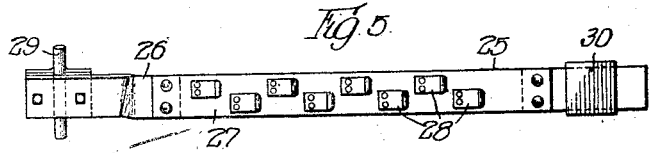
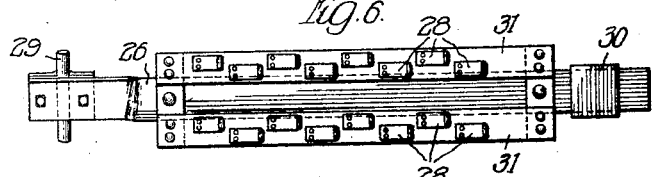
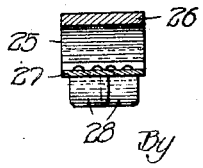
Witness:
P. Burkhardt.
Inventor:
Bert E. Hill,
By Cromwell, Greist & Warden
attys Patented Oct. 6, 1925.

1,556,112

UNITED STATES PATENT OFFICE.

BERT EUGENE HILL, OF CHICAGO, ILLINOIS, ASSIGNOR TO ALLIED PACKERS, INCORPORATED, OF CHICAGO, ILLINOIS, A CORPORATION OF DELAWARE.

APPARATUS AND PROCESS FOR DEHAIRING ANIMAL CARCASSES.

Application filed January 6, 1923. Serial No. 611,019.

*To all whom it may concern:*

Be it known that I, BERT EUGENE HILL, a citizen of the United States, residing at Chicago, in the county of Cook and State of Illinois, have invented certain new and useful Improvements in an Apparatus and Process for Dehairing Animal Carcasses, of which the following is a specification.

This invention is concerned with the dehairing of animal carcasses, and more particularly has to do with an improved apparatus and process for dehairing hogs.

The main and primary object of the invention resides in the provision of such an apparatus which is adapted to effect a thorough removal of the hair from the entire carcass, including particularly the more inaccessible portions which are ordinarily only partially dehaired by the forms of apparatus heretofore employed.

Another important object resides in the provision of a novel process for dehairing animal carcasses, one of the divers structural means for practicing which process is exemplified in the improved apparatus of this invention.

Other objects and advantages of this invention will become apparent as the nature of the same is understood from the following detailed description based upon the accompanying drawings wherein is shown what is now considered to be a preferred embodiment of the invention. It is evident that the construction hereinafter set forth may be varied in minor details without materially changing the principles underlying this disclosure, and it should therefore be understood that this embodiment is not intended to restrict the spirit of the invention or to limit unnecessarily the scope of the claims.

In the drawings—

Fig. 3 is an end elevation of the same;

Fig. 4 is a side elevation of one of the braking members;

Fig. 5 is a plan view of the same;

Fig. 6 is a side elevation of a modified form of the braking member; and

Fig. 7 is a transverse section taken on the line 7—7 of Fig. 4.

Figure 1:
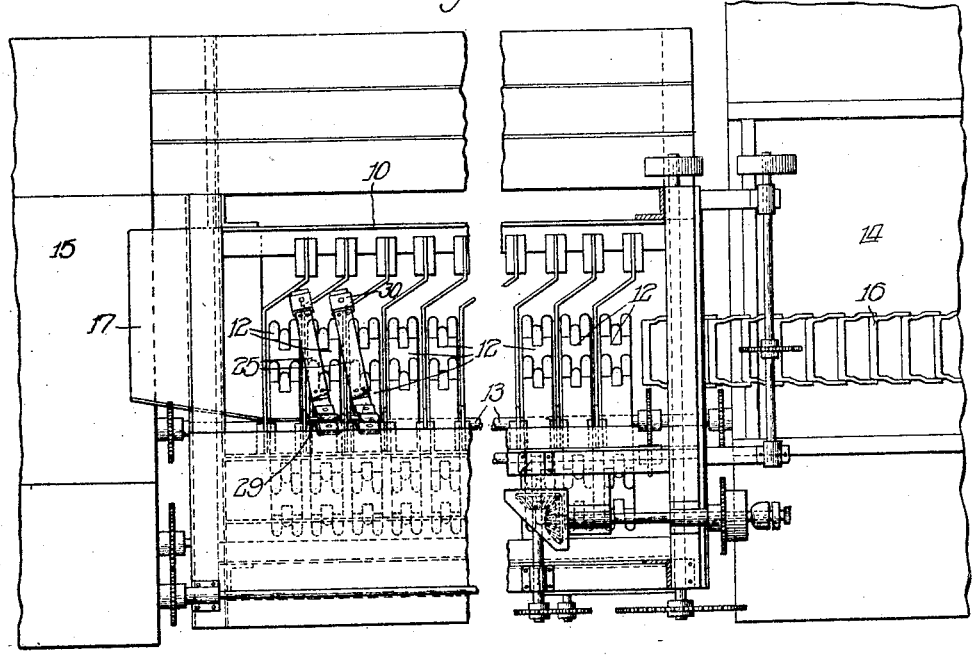
Fig. 1 is a plan view of a dehairing apparatus embodying the present invention.
Figure 2:
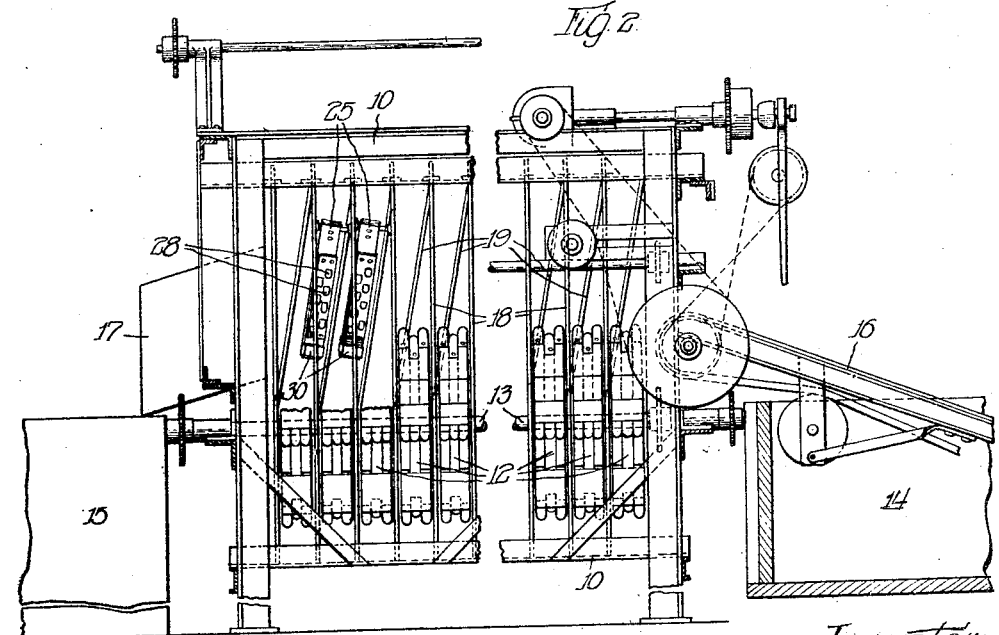
Fig. 2 is a side elevation of the same.

Referring to the drawings, it will be observed that the present invention is incorporated in a well-known form of dehairing machine which comprises a frame 10, an elongated passageway through the frame formed by a plurality of U-shaped bars 11 arranged in spaced relation with their central openings in alignment, and a plurality of rotatable scraping devices 12 mounted in the spaces between the bars 11 on a common operating shaft 13.

The frame 10 extends, as is usual, from a scalding tub 14 to a gambrelling bench 15; and the scalded hog carcasses to be dehaired are carried from the tub to the adjacent end of the passageway in the frame by means of an inclined conveyor 16 and are subsequently discharged in a dehaired condition from the other end of the passageway to the gambrelling bench by means of a chute 17. The U-shaped bars 11 which co-operate to form the passageway through the frame are each provided with a vertical side 18, an inclined side 19, and a base portion 20 which extends in a gradual curve between the two side portions. This construction of the bars 11 presents a helical arrangement of their inner edges 21 and serves to move the carcasses longitudinally of the passageway when the carcasses are rotated and jostled in the passageway by the scraping devices 12 and come into contact with the helical edges 21.

The scraping devices 12 are each provided with a hub 22 and a plurality of radially extending flexible beaters 23 which have curved scrapers 24 secured to their forward faces. The shaft 13 which operates the scraping devices 12 is arranged below and to one side of the passageway; and is so spaced from the same that when the devices are operated the beaters with their scrapers will swing upwardly and laterally through the bottom of the passageway in transversely extending arcs. As viewed from the scalding tub end of the passageway, the scraping devices 12 rotate in a counter-clockwise direction, and in so doing serve to rotate the hog carcass in a clockwise direction.

The dehairing apparatus thus far described is one which has been used heretofore with a fair degree of success but the same does not effect a thorough removal of the hair under some conditions owing to the facts, first, that the carcasses are rotated by the scraping devices at substantially the same speed as the devices and accordingly receive very little real scraping action, and second, that the more inaccessible portions of the carcasses, such as the necks for instance, are held by the larger diameters of the bodies away from the scrapers and do not receive the full action of the same. These disadvantages are eliminated by the hereinafter described construction forming the subject matter of this invention.

A plurality of members 25 are spaced longitudinally of the passageway and extend transversely across the same. Each member 25 consists of an arched supporting arm 26, a flexible strip 27 preferably of leather or other suitable material secured at its ends to the arm 26 and spanning the arch therein, and a plurality of scrapers 28; and is provided at one end with a pivot pin 29 disposed at a slight angle to its general plane, and at the other end with an adjustable weight 30. In Fig. 6 is shown a modification of the arm construction wherein two flexible strips 31 are substituted for the single flexible strip 27.

The members 25 are pivotally attached to the vertical sides 18 of the U-shaped bars by means of the pivot pins 29 which are secured to and extend at an inclination between the bars at points above the scraping devices 12. The free ends of the members extend across to the other side of the passageway and are adapted to move in the inclined spaces between the inclined sides 19 of the bars, the free ends being limited in their downward movement by adjustably arranged stop pins 32 which may be inserted in any one of several arcuately arranged holes 33. The angular attachment of the arched arms with the pivot pins 29, and the inclined positioning of the pivot pins between the U-shaped bars 11 are for the purpose of permitting a free swinging movement of the members 25 in the inclined spaces between the U-shaped bars while maintaining the general scraping planes of the members parallel to the axis of the curved lower portion of the passageway in order that the members will swing down flatly against the hides of the carcasses passing thereunder.

The operation of the dehairing apparatus of this invention is as follows:

The carcasses are fed by means of the conveyor 16 into the scalding tub end of the passageway and pass through the same in end to end abutment with their major axes substantially in alignment and in parallelism at all times with the central axis of the passageway.

The carcasses are caught up from below by the scrapers of the rotary scraping devices and are jostled vertically and rotated on their axes by the scraping devices as the beaters of the same successively come into action. In the absence of any braking action applied to the carcasses, the same will have imparted thereto a rotary movement which is substantially equal, or nearly so, to that of the scraping devices, wherefore very little relative movement between the scrapers and the hides of the carcasses will be had. The members 25 however are supported in partly raised positions by the carcasses passing thereunder, and exert a dampening action on the vertical jostling of the carcasses, a braking action on their rotation, and a scraping action which extends to the more inaccessible portions of the carcasses which the scraping devices 12 do not usually reach but which the members 25 drop down to and bear upon under a pressure regulated by an adjustment of the weights 30. When no portion of a carcass is below one of the members 25, the member will drop down to a position wherein its free end is supported by the stop pin 32, and as soon as a carcass comes into contact with the member the latter will be forced upwardly as far as the size of the carcass requires, the members riding up and down as the carcasses pass thereunder in conformity with the size of the portions on which they are operating. The degree of the dampening, braking and scraping actions applied by the members 25 may be varied as desired by changing the torque arms of the weights 30 on the free ends of the members.

I claim:

1. In an apparatus for dehairing animal carcasses, a stationary structure forming an elongated carcass-guiding passageway through which the carcasses travel in the direction of their longitudinal axes, a plurality of scraping devices arranged longitudinally of the passageway and movable transversely therein beneath the carcasses for scraping the same transversely in one direction, and a plurality of auxiliary scraping devices arranged longitudinally of the passageway and positioned transversely therein in spaced relation to the first mentioned devices for scraping the carcasses transversely in the reverse direction as the same are rotated on their axes by the scraping action of the first mentioned devices.

2. In an apparatus for dehairing animal carcasses, a stationary structure forming an elongated carcass-guiding passageway through which the carcasses travel in the direction of their longitudinal axes, a plurality of scraping devices arranged longitudinally of the passageway and movable transversely therein beneath the carcasses for scraping the same transversely in one direction, and a plurality of auxiliary scraping devices arranged longitudinally of the passageway and positioned transversely therein upon the carcasses in self-adjustably spaced relation to the first mentioned devices for scraping the carcasses transversely in the reverse direction as the same are rotated on their axes by the scraping action of the first mentioned devices.

3. In an apparatus for dehairing animal carcasses, a stationary structure provided interiorly with a plurality of inclined edge portions forming an elongated substantially horizontal carcass-guiding passageway through which the carcasses will travel in the direction of their longitudinal axes when rotated in engagement with the inclined edge portions of the passageway, a plurality of scraping devices arranged longitudinally of the passageway and movable transversely therein beneath the carcasses for scraping and rotating the same transversely in one direction, and a plurality of auxiliary scraping devices arranged longitudinally of the passageway and positioned transversely therein in vertically spaced relation to the first mentioned devices for scraping and retarding the carcasses in the reverse direction as the same are rotated on their axes by the scraping action of the first mentioned devices.

4. In an apparatus for dehairing animal carcasses, a plurality of U-shaped bars arranged in spaced relation with portions of their inner edges inclined and forming an elongated substantially horizontal carcass-guiding passageway through which the carcasses will travel in the direction of their longitudinal axes when rotated in engagement with the inclined edge portions of the passageway, a plurality of scraping devices arranged longitudinally of the passageway and movable transversely therein beneath the carcasses for scraping and rotating the same transversely in one direction, and a plurality of auxiliary scraping devices arranged longitudinally of the passageway and positioned transversely therein upon the carcasses in self-adjustably spaced relation to the first mentioned devices for scraping and retarding the carcasses transversely in the reverse direction as the same are rotated on their axes by the scraping action of the first mentioned devices.

5. In an apparatus for dehairing animal carcasses, a stationary structure forming an elongated carcass-guiding passageway through which the carcasses travel in the direction of their longitudinal axes, a rotary shaft extending parallel to the passageway and arranged below and to one side of the same, a plurality of scraping devices secured to the shaft and movable arcuately through the lower portion of the passageway beneath the carcasses for scraping the same transversely in one direction, a plurality of arms pivoted for movement in vertical planes transversely of the passageway on axes substantially parallel to and above the rotary shaft, and a plurality of scraping devices secured to the arms and positioned transversely in the upper portion of the passageway upon the carcasses for scraping the same in the reverse direction as the carcasses are rotated on their axes by the scraping action of the first mentioned devices.

6. A method for dehairing animal carcasses, which consists in concurrently moving the carcass in the direction of its longitudinal axis, scraping the carcass in a direction transverse to its longitudinal axis whereby a torque is applied to the carcass tending to rotate the same, and scraping the carcass in the reverse direction.

7. A method for dehairing animal carcasses, which consists in concurrently moving the carcass in the direction of its longitudinal axis, scraping the carcass in a direction tranverse to its longitudinal axis whereby a torque is applied to the carcass tending to rotate the same, and scraping the carcass in the reverse direction with a relative movement created by the rotation of the same.

In testimony whereof I have hereunto subscribed my name.

BERT EUGENE HILL.